Oct. 29, 1935.  C. M. F. FRIDEN  2,019,301
RECORDER
Filed Oct. 12, 1929   12 Sheets-Sheet 1

INVENTOR
Carl M. F. Friden
BY White, Prost, Hehr & Lothrop
ATTORNEYS

Oct. 29, 1935. C. M. F. FRIDEN 2,019,301
RECORDER
Filed Oct. 12, 1929    12 Sheets-Sheet 2

INVENTOR
Carl M. F. Friden
BY White, Prost, Hehr & Lothrop
ATTORNEYS

Oct. 29, 1935.  C. M. F. FRIDEN  2,019,301
RECORDER
Filed Oct. 12, 1929  12 Sheets-Sheet 3

FIG_3_

INVENTOR
Carl M. F. Friden
BY
White, Prost, Fleha & Lothrop
ATTORNEYS

Oct. 29, 1935.  C. M. F. FRIDEN  2,019,301
RECORDER
Filed Oct. 12, 1929   12 Sheets-Sheet 5

INVENTOR
Carl M. F. Friden
BY White, Prost, Flehr & Lothrop
ATTORNEYS

Oct. 29, 1935.   C. M. F. FRIDEN   2,019,301
RECORDER
Filed Oct. 12, 1929    12 Sheets-Sheet 6
FIG. 6.
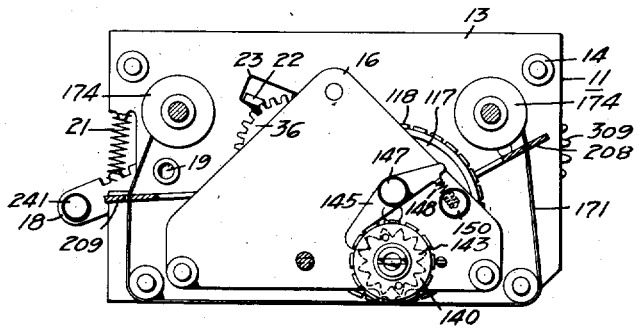
FIG. 7.
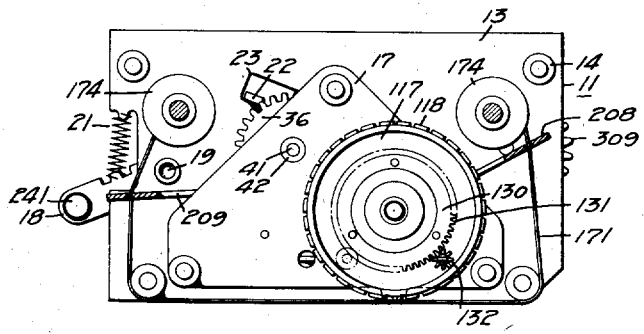
FIG. 8.    FIG. 9.
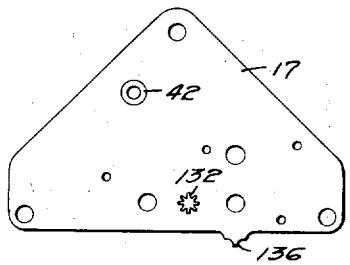  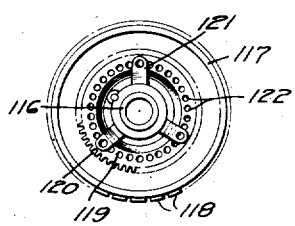
INVENTOR
Carl M. F. Friden
BY White, Prost, Hehr & Lothrop
ATTORNEYS Oct. 29, 1935.   C. M. F. FRIDEN   2,019,301
RECORDER
Filed Oct. 12, 1929   12 Sheets-Sheet 7

INVENTOR
Carl M. F. Friden
BY
White, Prost, Flehr & Lothrop
ATTORNEYS

Oct. 29, 1935.  C. M. F. FRIDEN  2,019,301
RECORDER
Filed Oct. 12, 1929   12 Sheets-Sheet 8

INVENTOR
Carl M. F. Friden
BY White, Prost, Hehr & Lothrop
ATTORNEYS

Oct. 29, 1935.  C. M. F. FRIDEN  2,019,301
RECORDER
Filed Oct. 12, 1929   12 Sheets-Sheet 9
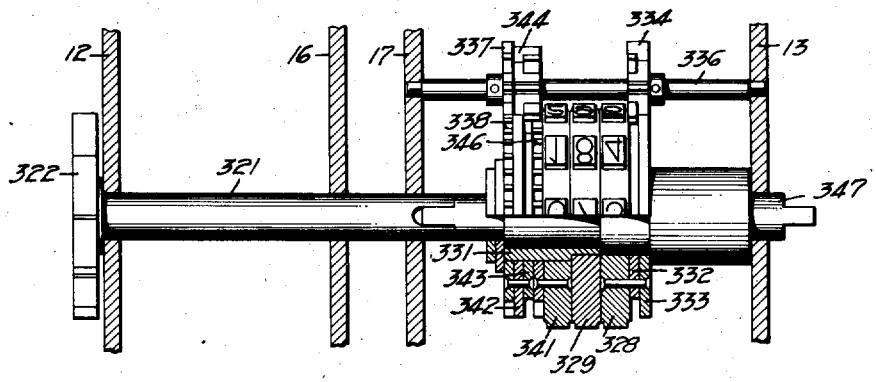
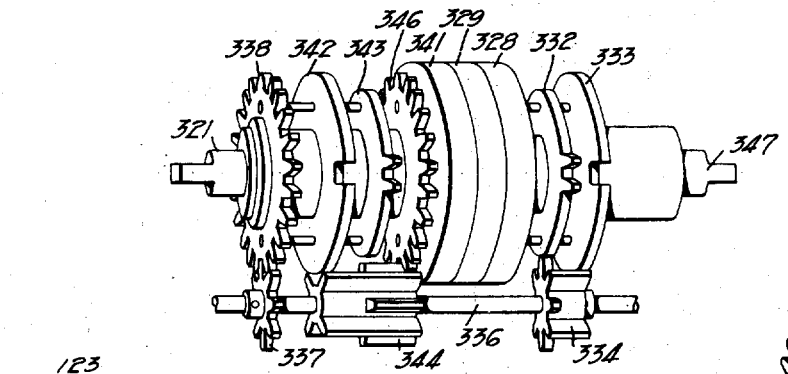
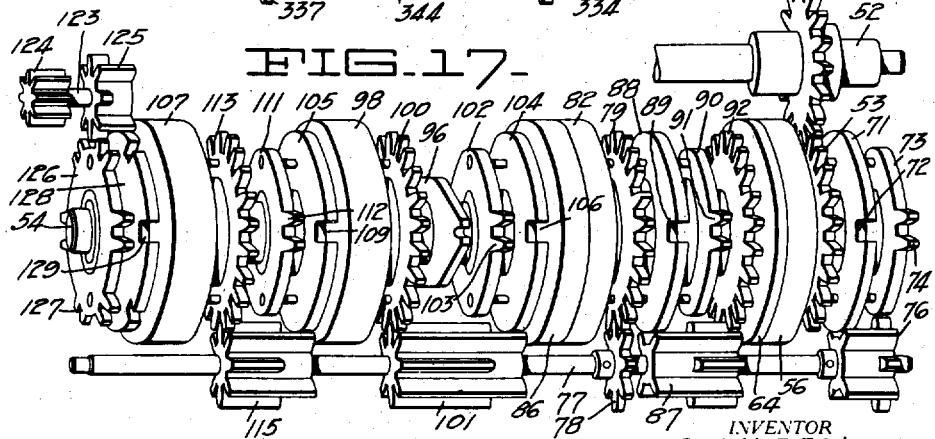
INVENTOR
Carl M. F. Friden
BY
White, Prost, Flehr & Lothrop
ATTORNEYS Oct. 29, 1935.   C. M. F. FRIDEN   2,019,301
RECORDER
Filed Oct. 12, 1929   12 Sheets-Sheet 10
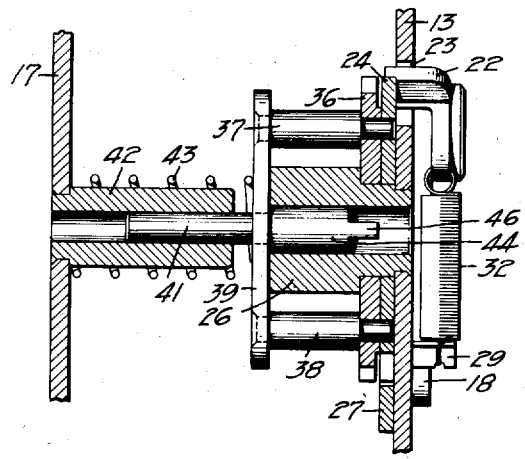
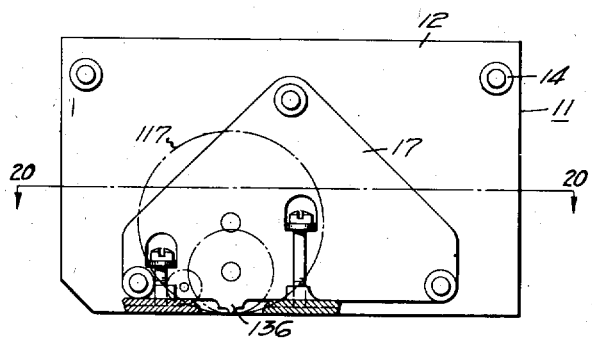
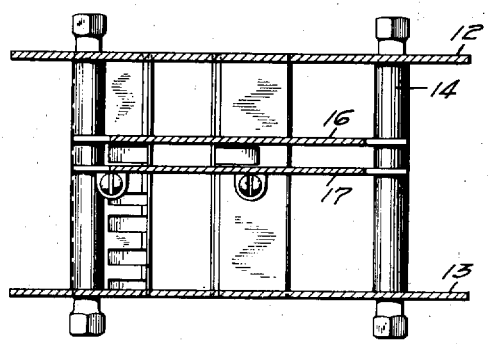
INVENTOR
Carl M. F. Friden Oct. 29, 1935.   C. M. F. FRIDEN   2,019,301
RECORDER
Filed Oct. 12, 1929   12 Sheets-Sheet 11
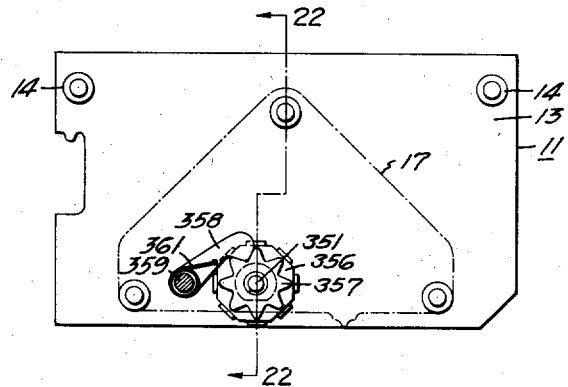
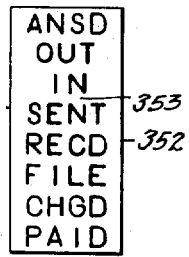
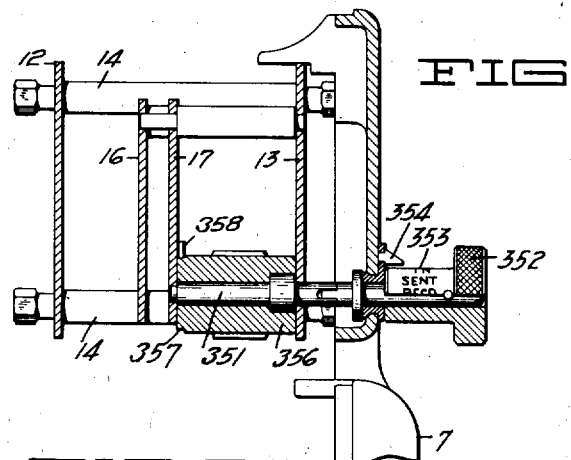
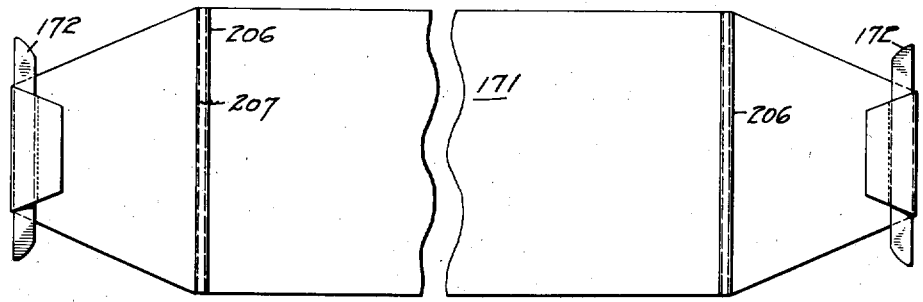
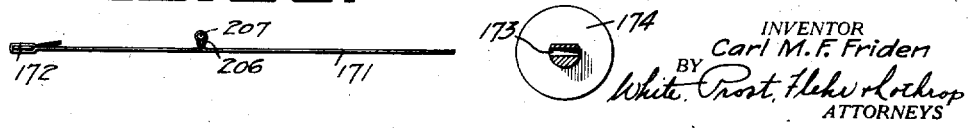
INVENTOR
Carl M. F. Friden
BY
ATTORNEYS Oct. 29, 1935.   C. M. F. FRIDEN   2,019,301
RECORDER
Filed Oct. 12, 1929   12 Sheets-Sheet 12

INVENTOR
Carl M. F. Friden
BY White, Prost, Fleher & Lothrop
ATTORNEYS

Patented Oct. 29, 1935

2,019,301

UNITED STATES PATENT OFFICE 2,019,301

RECORDER

Carl M. F. Friden, Piedmont, Calif., assignor, by mesne assignments, to International Business Machines Corporation, New York, N. Y., a corporation of New York Application October 12, 1929, Serial No. 399,232

1 Claim. (Cl. 101—287)

My invention relates to devices for affording a record of pertinent data, such, for instance, as time. The device of my invention is particularly applicable for recording time to within minutes and fractions of minutes. Machines of this general character which have previously been developed fall somewhat short of these capabilities and in addition require a considerable amount of manipulation on the part of the operator to set the machines and to operate the machines after they have been manually set.

An object of my invention is to provide a recorder which is substantially automatic in its operation.

Another object of the invention is to provide a device which is operative to record, on an applied sheet or surface, the time at which the record is made and also a serial number for indicating the precedence of recorded times.

A further object of my invention is to provide a recorder which will print substantially all of the pertinent data desired in a straight line and in characters of the sort ordinarily used in printing.

Another object of my invention is to provide an automatically operated ribbon feeding or advancing mechanism in a machine of this type.

A further object of my invention is to provide means for preventing a printing operation during mutations or changes in the timing mechanism.

The foregoing and other objects are attained in the embodiment of the invention shown in the drawings, in which Figure 1 is a front elevation of the recorder of my invention.

Fig. 6 is a side elevation of the time recording unit of my recorder, the ribbon advancing mechanism being removed.

Fig. 7 is a side elevation of the time recording unit of my recorder with mechanism removed to disclose the day wheel.

Fig. 8 is a detail of one of the supporting plates in the time recording unit frame.

Fig. 9 is a detail showing in elevation the overrunning clutch drive for the date wheel in the time recording unit.

Fig. 15 is a detail showing the consecutive numbering unit in elevation, some parts being in cross section.

Fig. 16 is a detail similar to Fig. 15 but showing in perspective the printing wheels of the consecutive numbering unit.

Fig. 17 is a view similar to Fig. 14 and shows in perspective the printing wheels on the main printing wheel shaft.

Fig. 18 is a cross section through the axis of the main ratchet drive.

Fig. 19 is a side elevation of the frame of the time recording unit, portions being shown in cross section.

Fig. 20 is a cross section on the line 20—20 of Fig. 19.

Fig. 21 is a side elevation of the time recording unit showing a modified indicia drum in place.

Fig. 22 is a cross section on the line 22—22 of Fig. 21.

Fig. 23 is a development showing suitable indicia for the indicia drum of Fig. 21.

Fig. 24 is a plan of a ribbon suitable for use in my recorder, portions being broken away to reduce the size of the figure.

Fig. 25 is a section through one end of the ribbon shown in Fig. 24.

Fig. 26 is a transverse cross section of a ribbon spool useful in conjunction with the ribbon of Fig. 24.

Figure 28:
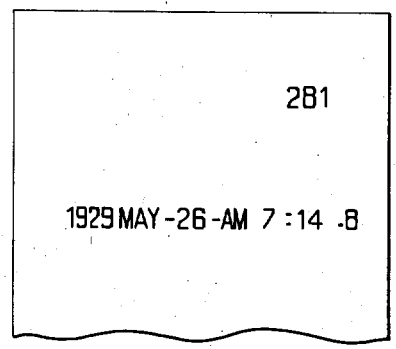

Fig. 28 indicates the type of record made by my machine.

In its preferred form, the recorder of my invention includes a printing surface which is conditioned for printing time indicia in synchronism with a motor operating at a predetermined frequency in combination with means for obtaining a record of the time indicia.

In the embodiment of my invention shown in the drawings, I provide a base 5, conveniently of cast metal, to which is affixed a pair of side plates 6 and 7. Secured to the side plates are cover plates 8 and 9 for completing a housing for the mechanism. Within the housing so provided I preferably dispose mechanism capable of printing indicia representing time. Carried by the side plates 6 and 7 is a framework 11 including end plates 12 and 13 located by spacers 14. Fastened to the spacers 14 are intermediate plates 16 and 17 which assist the end plates in supporting the mechanism.

The time recording unit of my device is preferably actuated by periodic impulses which are transmitted to a bell crank 18 pivotally mounted, as at 19, on the end plate 13. The bell crank is urged toward one extreme position by a spring 21 confined between one arm of the bell crank and the end plate 13. Pivoted to the other arm of the bell crank is a pawl 22 at its end deformed to pass through an aperture 23 in plate 13 and to lie in the path of a ratchet 24 journalled on a ferrule 26 fastened to the end plate 13. Oscillatory movement of the bell crank 18 reciprocates the pawl 22 and rotates the ratchet 24 intermittently.

In order to prevent retrograde movement of the ratchet I provide a pawl 27 at one end pivoted, as at 28, to the plate 13 and at the other end carrying an arm 29 passing through an aperture 31 in plate 13 to engage a spring 32. The spring is also connected to the pawl 22 so that both the pawls 22 and 27 are urged into engagement with the teeth of ratchet 24. In this fashion there is provided means for exactly rotating the ratchet one step for each oscillation of the bell crank 18.

To provide a disengageable means for transmitting the movement of ratchet 24 to other portions of the mechanism I preferably mount a main driving gear 36 for free rotation on the ferrule 26. Piercing aligned apertures in the ratchet 24 and in the gear 36 are pins 37 and 38 secured to a cross head 39. Carrying the cross head is a shaft 41 axially movable in a sleeve 42 fastened to intermediate plate 17. Although the shaft 41 is capable of axial movement within the sleeve 42 it is normally urged toward one extreme position by a spring 43 interposed between the cross head and the plate 17. The pins 37 and 38 are thus normally seated in aligned apertures in the ratchet 24 and the main gear 36 so that movement of the ratchet is productive of coincidental movement of the gear.

To overcome the urgency of spring 43 and to disengage the pins 37 and 38 from the ratchet 24 I provide on the shaft 41 an extension 44 which at one end is preferably irregularly formed, as at 46, to receive a complementary key, not shown. When the key is inserted into the ferrule 26 and the shaft 41 is thereby axially displaced, the pins 37 and 38 are disengaged from the ratchet 24 but remain in engagement with the gear 36 so that rotation of the extension 44 is productive of a similar rotation of the gear 36. Upon removal of the key, spring 43 again causes the pins 37 and 38 to engage suitable apertures in the ratchet 24 and the drive from the bell crank 18 to the gear 36 is again made positive.

In accordance with my invention, I preferably take advantage of the impulses of bell crank 18 transmitted through gear 36, to condition suitable printing wheels or printing surfaces for recording time indicia. An intermediate gear 51 mounted on a stub shaft 52 is in mesh with the main gear 36 and is also in mesh with a gear 53 comprised in a printing unit mounted on a stationary shaft or spindle 54 fixed between plates 13 and 17 of the framework.

Secured to gear 53 and adapted to rotate in step therewith is a tenths printing wheel 56 This printing wheel is provided with a printing surface 57 bearing a plurality of time indicia in this instance numerals denoting successive fractions of a minute, preferably tenths of a minute. Since each of the indicia is disposed in a predetermined location on the printing wheel 56 and since I desire accurate location of the indicia I preferably mount the printing wheel 56 on a sleeve 58 which is rotatable on the spindle 54. The interior of the sleeve is preferably non-circular in contour to be engaged by a detent 59 located in a diametral bore 61 in the spindle. The detent is urged by a spring 62 into the depression or non-circular portions of the sleeve to correct for any slight inaccuracies in the movement of the printing wheel 56 and to locate accurately the indicia on the surface thereof.

Preferably connected to the tenths wheel 56 is a decimal wheel 64 carrying type for a plurality of decimal points for association with the numerals of the tenths wheel. The relationship of the various elements of the motion train thus far described is such that the tenths wheel is revolved intermittently or step by step in accordance with the movement of the bell crank 18. This is arranged so that one impulse or cycle of the bell crank 18 advances or revolves the tenths wheel to expose successive indicia one at a time. In other words the tenths wheel is conditioned in accordance with the operation of bell crank 18.

Since one revolution or cycle of the tenths wheel represents a time interval of one minute I preferably afford means for indicating this interval of time. Comprised in the unit of which the tenths wheel forms a part is a carrying mechanism, which preferably includes a disc 71 fastened to the tenths wheel and having a notch 72 in its periphery. Associated with the disc is an interrupted gear 73 which is smooth for the greater portion of its periphery but is provided with a pair of teeth 74. Adapted to co-operate with the disc 71 and the gear 73 is a gear 76 fixed on a shaft 77 journalled in the plates 13 and 17. The arrangement of teeth on the gear 76 is such that for each revolution of the disc 71 and of the gear 73, the gear 76 is revolved for a predetermined portion of a revolution. Thus for each complete cycle or revolution of the tenths wheel the shaft 77 is revolved a predetermined amount.

I take advantage of this revolution by providing on the shaft 77 a gear 78 which revolves therewith and meshes a gear 79 freely rotatable on a sleeve 81 encompassing the stationary spindle 54. Joined to the gear 79 is a minute units wheel 82 which on its periphery is provided with indicia 83 forming a printing surface. The arrangement of gearing is such that the printing wheel 82 is revolved step by step, each step representing the advance of one numeral to printing position so that for each complete revolution of the tenths wheel 56 the minute units wheel is advanced one step.

I also provide a minute tens wheel 86 and in order to advance the wheel 86 in proper relation to the rest of the mechanism I provide means for carrying the revolution of printing wheel 82 proportionally to the printing wheel 86. Freely rotatable on the shaft 77 is a gear 87 adapted to be engaged by a disc 88 having a notch 89 in the periphery thereof and also to be engaged by an interrupted gear 90 having a plurality of teeth thereon. The disc 88 and gear 90 are affixed to the gear 79 which turns in unison with the printing wheel 82. Thus for each revolution of the minute units wheel, the gear 87 is revolved a predetermined part of a revolution on the shaft 77. This step by step movement is transmitted to a gear 92 which is affixed to and rotates the sleeve 85. On this sleeve the minute tens wheel 86 is set so that for each step of advancement of gear 87 the printing wheel 86 is advanced one step. The printing wheel 86 is provided with indicia on its face, usually two identical series of numerals from 0 to 5. For each revolution of the minute units wheel the minute tens wheel is advanced one step to position for printing one indicium of the succession.

Adjacent the printing wheel 86 I preferably provide a printing die 96 usually contoured to print a colon in the fashion customary for printing time. The die 96 is positioned by a stud 97 held between plates 16 and 17.

To record the number of revolutions of the minute tens wheel 86, I preferably provide a printing wheel 98 which is provided with indicia 99 on its face designed to indicate hours. The hour wheel 98 is provided with a gear 100 meshing a gear 101 loosely mounted on shaft 77. Also meshing with gear 101 is an interrupted gear 102 having two diametrically opposite pairs of teeth 103, which cooperates with a disc 104 having two diametrically opposite notches 106 in its periphery for imparting a step by step movement to gear 101 in accordance with the rotation of the minute tens wheel 86. For each half-revolution of the minute tens wheel the gear 101 is revolved a predetermined portion of a complete revolution and, through gear 100 correspondingly revolves the printing wheel 98 a similar portion of a complete revolution. The arrangement of gearing is such that for each half-revolution of the minute tens wheel the hour wheel is advanced sufficiently far to bring into printing position a successive indicium.

In a similar fashion I provide means for indicating whether the time recorded is ante-meridian or post-meridian. Mounted on a sleeve 5 freely rotatable on the spindle 54 is a meridian printing wheel 107. This wheel is provided on its periphery with indicia 108 preferably including the characters "A. M." and "P. M." alternately. I preferably provide means for advancing the wheel 107 one step for each revolution of the hour wheel 98.

This is effected in a manner similar to that previously described by providing the hour wheel with a disc 105 having a notch 109 in its periphery and also with an interrupted gear 111 having a pair of teeth 112 thereon. Since the disc 105, gear 111 and wheel 98 all turn in unison they are effective to revolve a meshing gear 115 one step for each complete revolution. The gear 115 being loosely mounted on shaft 77 and in mesh with a gear 113 fixed to revolve with the wheel 107 there is imparted to the meridian wheel 107 one step of rotation for each complete cycle or revolution of the hour wheel 98. The arrangement of indicia 108 and of the gearing is such that one revolution of the hour wheel 98 takes place while an index "A. M." is in printing position while during the subsequent complete rotation of the hour wheel 98, the index "P. M." is in printing position. Since the hour wheel 98 makes two revolutions per day the indication of the meridian wheel is automatically coordinated.

In addition to the foregoing time recording mechanism I preferably afford means for indicating the day of the month. Mounted on a sleeve 116 journalled on the stud 97 is a day wheel 117. The day wheel on its periphery carries indicia 118 representing numerically the days of the month. For driving the day wheel 117 I provide a ring gear 119 freely journalled on the day wheel and having teeth 120 on its periphery. In order to constrain relative rotation between the day wheel and the ring gear I provide spring arms 121 offset to seat in depressions 122 formed in the ring gear. The spring arms 121 are clamped to revolve with the day wheel while by the exertion of a superior force the ring gear 119 can be rotated with respect to the day wheel.

For revolving the day wheel in a corresponding relation to the revolution of the meridian wheel 107, I provide a shaft 123 journalled in the plate 17 and at one end carrying a pinion 124 meshing with the teeth 120. At its other end, the shaft 123 carries a gear 125 adapted to be actuated by an interrupted gear 126 having a plurality of groups of teeth 127 at suitable intervals on its periphery and by a disc 128 having a plurality of co-operating notches 129 on its periphery. The gear 126 and the disc 128 are fastened to the meridian wheel 107 to turn in unison therewith. The arrangement of the teeth and notches is such with respect to the gear 125 that for each two steps of advancement of the meridian wheel the gear 125 is advanced a predetermined portion of a revolution. This in turn through pinion 124 and ring gear 119 advanced the day wheel 117 from one indicium 118 to the next successive indicium, thus indicating an advance of one day.

Preferably the day wheel is provided with numerals from 1 to 31 corresponding to the number of days in a long month, but in order to correct the mechanism for shorter months I provide a manually operable correcting means which can supersede the means for automatically driving the day wheel. Fixed to the day wheel 117 is a ring gear 130 having teeth 131 on its periphery which are engaged by a pinion 132 mounted on a shaft 133 journalled in plates 12 and 16. The extremity of the shaft 133 is contoured, as at 134, to receive a key, not shown. Rotation of shaft 133 by means of the key is effective to revolve the day wheel 117 through the medium of pinion 132 and gear 130. Since the force of revolution in this manner is superior to the resistance of the spring drive through spring arms 121 and ring gear 119, the day wheel can be properly set despite operation of the automatic mechanism at variance therefrom.

To complete the time and date indication I preferably provide means for printing years and months and also preferably augment such means with extensions 135 and 136 on the intermediate plates 16 and 17 for printing dashes in the usual fashion of recording dates. To print the months I provide a month wheel 137 which is secured to a shaft 138 at one end journalled in the plate 16. The other end of shaft 138 lies within a sleeve 75

139 journalled in plate 12 and carrying fixed thereon a year wheel 140. Both the wheels 140 and 137 carry suitable indicia on their periphery. The shaft 138 and the sleeve 139 are at their exterior extremity provided with irregular portions 141 and 142 respectively, for receiving operating keys, not shown. By suitable manipulation of such keys the month wheel and the year wheel can be suitably set. To retain the wheels in set position I preferably afford each of them with ratchets 143 and 144 which are engaged by pawls 145 and 146 mounted on a carrier 147 projecting from plate 16. The pawls are urged against the ratchet by springs 148 and 149 seated in a projection 150 from the intermediate plate 16.

The mechanism previously described is effective automatically to condition the printing surfaces for indicating time intervals automatically in accordance with the impulses received by the bell crank 18. The year and months wheels are exceptions to such operation but they have to be conditioned relatively infrequently. However, all of the various printing wheels can be manually set to indicate initially the correct time of starting the machine.

I preferably provide means for propelling a sheet or other article to receive an impression toward the printing wheels. Forming part of the boundary of a slot 151 defined by the casing of the machine is a platen 152 conveniently surfaced with slightly yielding material. Secured to the platen is a stem 153 guided in a bushing 154 held by the field magnet 156 of a solenoid mounted on the base 5. Telescopically engaging the stem 153 is a cylindrical armature or core 157 adapted to be lifted by solenoid action when the field is energized. I preferably afford some lost motion in the telescopic connection between the plunger and the stem so that a blow against the stem by the armature is effective sharply to lift the platen 152. The return movement of the parts is effected by gravity. To provide a suitable field for the solenoid, a coil 158 surrounds the armature 157 and is connected in a suitable electric circuit. Upon energization or completion of the circuit the coil 158 is energized, the armature or core 157 is lifted and strikes the stem 153 to raise the platen 152 toward the printing wheel.

I preferably affect the electric circuit for effecting the printing operation by the insertion into the slot 151 of a sheet or other device to be imprinted. A contact 161 is mounted on the frame and is connected by a conductor 162 with a source of electro-motive force. A co-operating contact 163 is resiliently mounted on the frame and is insulated from the contact 161 except in a restricted portion. The location of contact 163 is preferably in the path of insertion of a sheet to be imprinted. A conductor 164 leads from contact 163 through the coil 158 and back to the source of electro-motive force so that when contacts 161 and 163 are in abutment the circuit is closed, the coil is energized and the sheet is propelled toward the printing wheels. When the contacts are broken at the conclusion of the printing operation the parts return to their previous positions. As an aid to positioning the sheet, I provide preferably a pair of depending arms 166 and 167 which by their weight aid in locating the sheet.

The inserted sheet engages the yielding finger carrying the contact 163 and moves the contact into engagement with contact 161, closing the electric circuit and thus causing an abrupt upw[ard] movement of the platen 152, on which the inser[ted] sheet is disposed. The upward printing mo[ve]ment of the platen moves the edge of the inser[ted] sheet out of contact with the yielding finger, p[er]mitting it to move forward to open the circ[uit] so that the printing mechanism operates o[nly] once for each insertion of a sheet. When the c[ir]cuit has opened, the platen falls, leaving the [in]serted sheet overlying the upper end of the yie[ld]ing finger. The weight of the arms 166 is insu[ffi]cient to cause the sheet to press the yielding fin[ger] backward again to close the circuit. Usually [the] stamped sheet is withdrawn immediately sub[se]quent to the printing operation so that the pos[si]bility of a second stamping operation, even un[der] adverse circumstances or improper adjustm[ent] of the machine, is rather remote.

So that the impression made by the print[ing] wheels will be clearly legible I preferably p[ro]vide an inking means. In the present insta[nce] this takes the form of a ribbon interposed [be]tween the printing wheels and the platen. T[he] ribbon 171 is of any convenient kind and at e[ach] end is preferably provided with a retainer [ ] adapted to hold the ribbon in position when i[t is] threaded through an aperture 173 in each of [the] ribbon spools 174. The spools are convenien[tly] mounted between the plates 12 and 13 and t[he]y carry at one end ratchet wheels 176 and 177. T[he] ribbon is preferably threaded through the m[a]chine to pass from one spool over spacers 14 a[nd] the printing wheels and onto the other spool.

I preferably provide means for suitably [ro]tating one of the spools to wind the ribbon the[re]on during the operation of the machine. [For] this purpose I conveniently derive motion fr[om] the core 157 of the printing solenoid. The c[ore] is provided with a projecting pin 178 which [is] engaged by the forked end of a lever 179 whi[ch] at its other end, is pivoted, as at 181, to the b[ase] 5. Also pivoted to lever 179 is an arm 182 co[n]nected to a rocker 183 secured to the end plate by a pivotal mounting. Each time the core [157] completes a cycle the rocker 183 likewise is osc[il]lated through a complete cycle.

The movement of rocker 183 is communic[at]ed to a bell crank 184 which is pivoted, as at 1[ ] to the plate 12. The communication of mo[ve]ment is effected through the medium of a c[am] surface 187 on the rocker which contacts a p[in] 188 on the bell crank. A spring 189 anchored [to] plate 12 maintains contact between the bell cra[nk] and the rocker. To the opposite arm of the b[ell] crank is pivoted a yoke 191 which intermedi[ate] its ends is provided with a longitudinal slot [ ] riding over a pin 193. The yoke at its upper e[nd] is branched to provide arms 194 and 196 whi[ch] are substantially identical but are arranged [in] reverse symmetry. The arm 194 at its end pi[v]otally supports a pawl 197 adapted to engage t[he] ratchet 176 in one direction of motion. The r[e]turn movement of the pawl 197 has no effect up[on] the ratchet but in order to insure against retr[o]grade movement of the ratchet 176 I provide [a] pawl 198 which is pivotally mounted on pin 1[ ]

In a similar fashion arm 196 is provided wi[th] a pawl 199 pivoted to the end of arm 196 ar[d] adapted when in the path of ratchet 177 to r[e]volve the ratchet in a direction opposite to t[he] direction of revolution of ratchet 176. To pr[e]vent retrograde movement of ratchet 177, a pa[wl] 201 is pivoted on pin 193 and both pawls 2[01] and 198 are urged in the proper direction by [a] spring 202 engaging the pawls and coiled abo[ut]

he pin 193. A spring 203 engages ears on each of the pawls 197 and 199 and is anchored to a projection 204 on the yoke for urging the pawls 97 and 199 in the proper direction. The oscillating movement of bell crank 184 reciprocates the yoke 191 on pin 193 in such a fashion that pawl 97 in one position of the yoke operates the ratchet 176 to wind the ribbon upon the associated spool. This reciprocatory movement is ultimately derived from the reciprocation of the solenoid core 157 through the linkage described.

I preferably provide means for automatically reversing the direction of advance of the ribbon at proper intervals. Situated in the ribbon 171 at approximately each end thereof is a fold 206 in which is contained a rod 207. Substantially encompassing the ribbon adjacent each of the spools are slotted plates 208 and 209 through which the ribbon passes. As particularly shown in Fig. 5 the plate 208 bears against a lever 211 which is pivoted as at 212 to the plate 12. In a similar fashion the plate 209 bears against a lever 213 pivoted as at 214 on the plate 12. Each of the levers 211 and 213 is provided with an ear 215 attached to a common spring 217 for urging the levers toward each other. Situated between the two pivots 212 and 214 is a plate 218 pivoted at its lower end 219 to the plate 12, and carrying intermediate its ends the pin 193 which projects through an enlarged aperture to the opposite side of the plate 12 and functions in slot 92 as has been described. Extending from plate 18 are ears 221 and 222 which are suitably spaced alternately to lie in co-operating notches 223 and 224 in catches 226 and 227 respectively. Each catch is provided with a pivot 228 mounted on plate 12 and is also shaped to accommodate a common spring 229 for urging the catches apart. From the catches depend cam arms 231 adapted to effect the associated levers 211 and 213.

Figure 1:
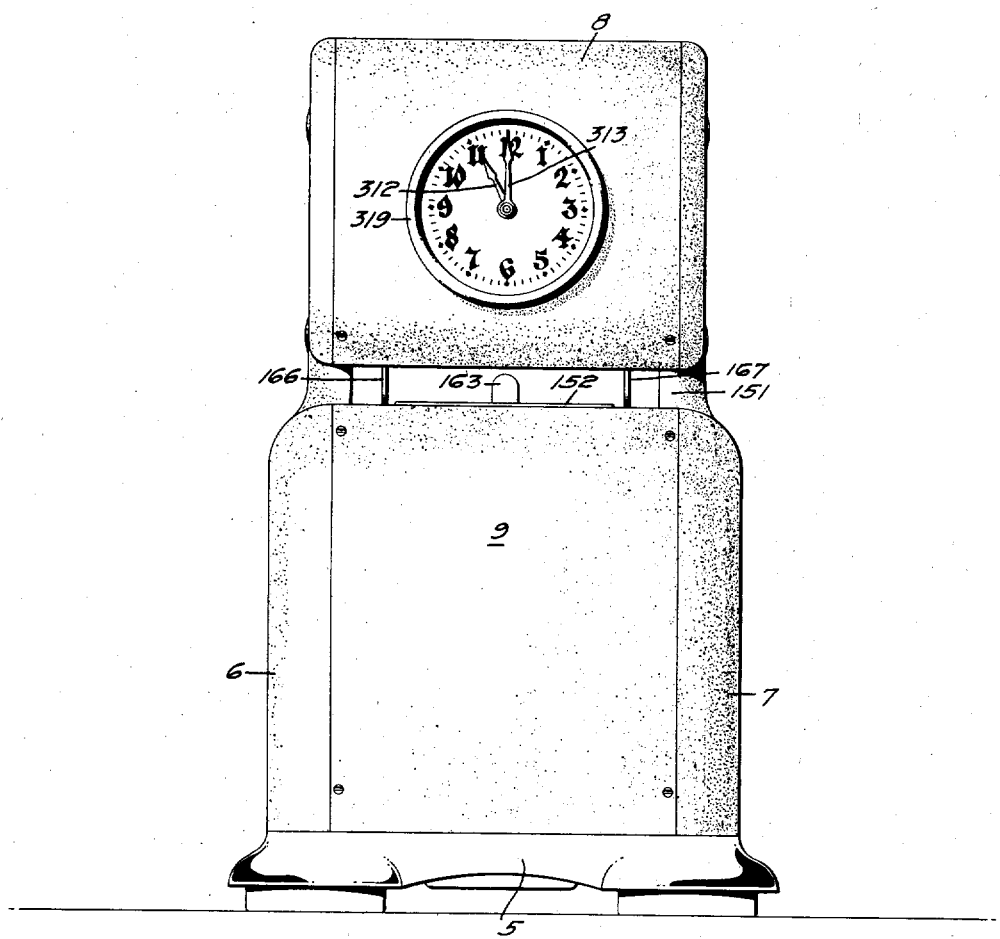
Figure 2:
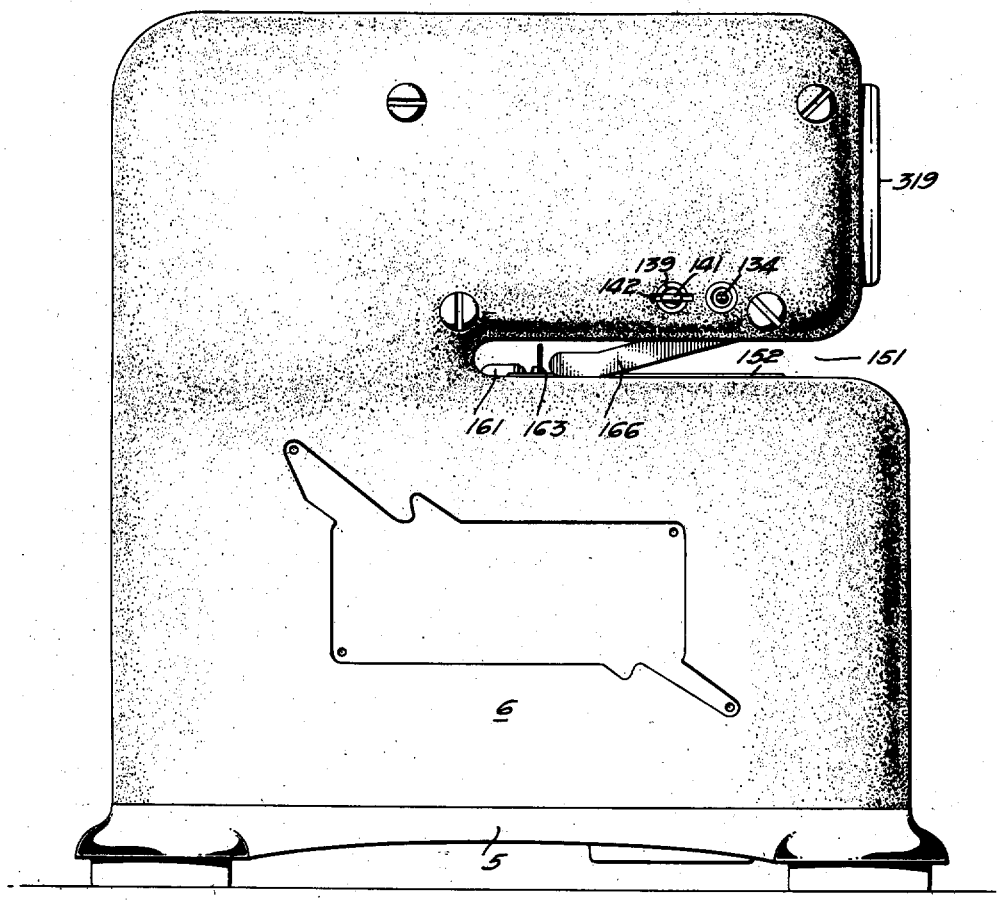
Fig. 2 is a side elevation of the recorder of my invention.
Figure 3:
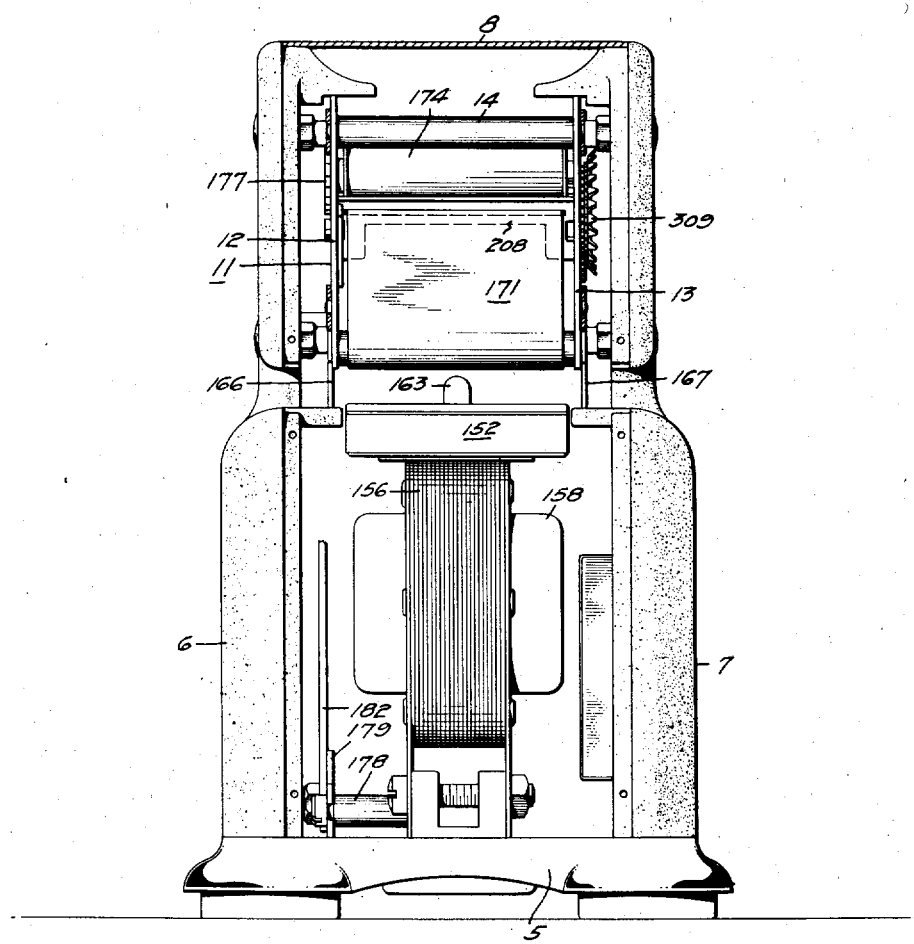
Fig. 3 is a front view of my recorder with the casing removed to show a portion of the interior.
Figure 4:
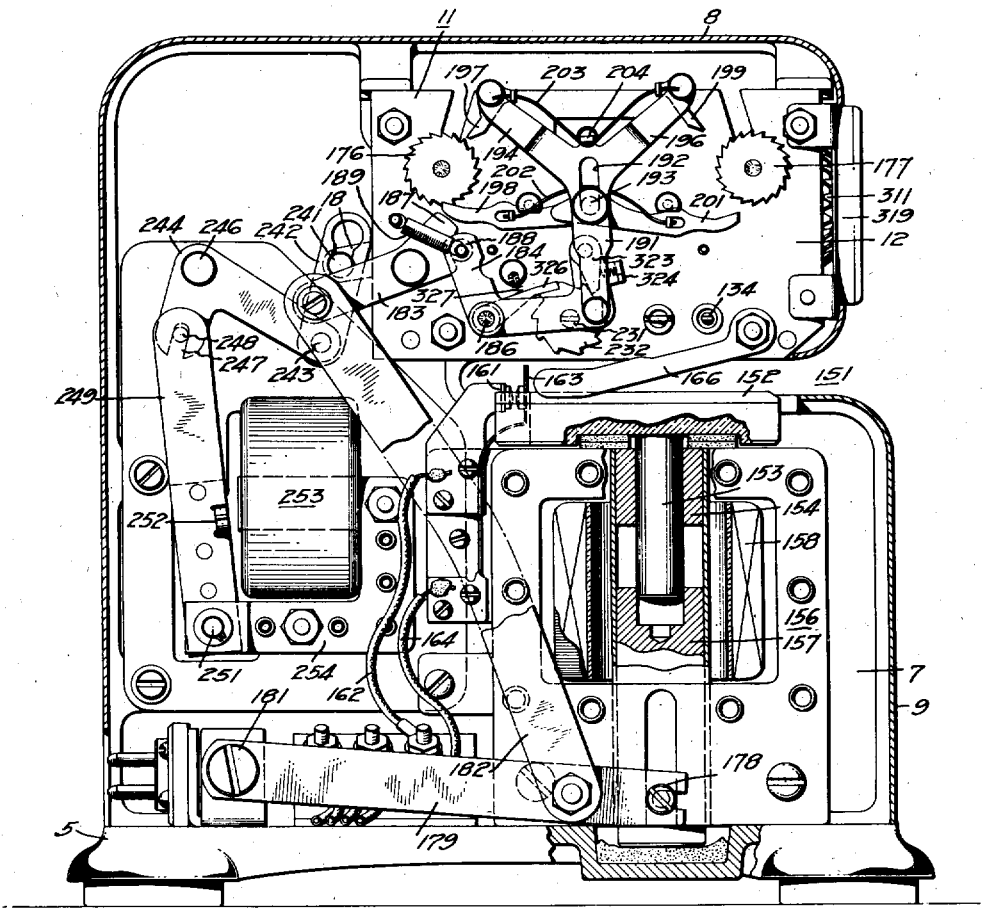
Fig. 4 is a side view similar to Fig. 2 but with a portion of the casing removed to show the interior mechanism, some of which is indicated in cross section and some of which is broken away to increase the clarity of the drawings.
Figure 5:
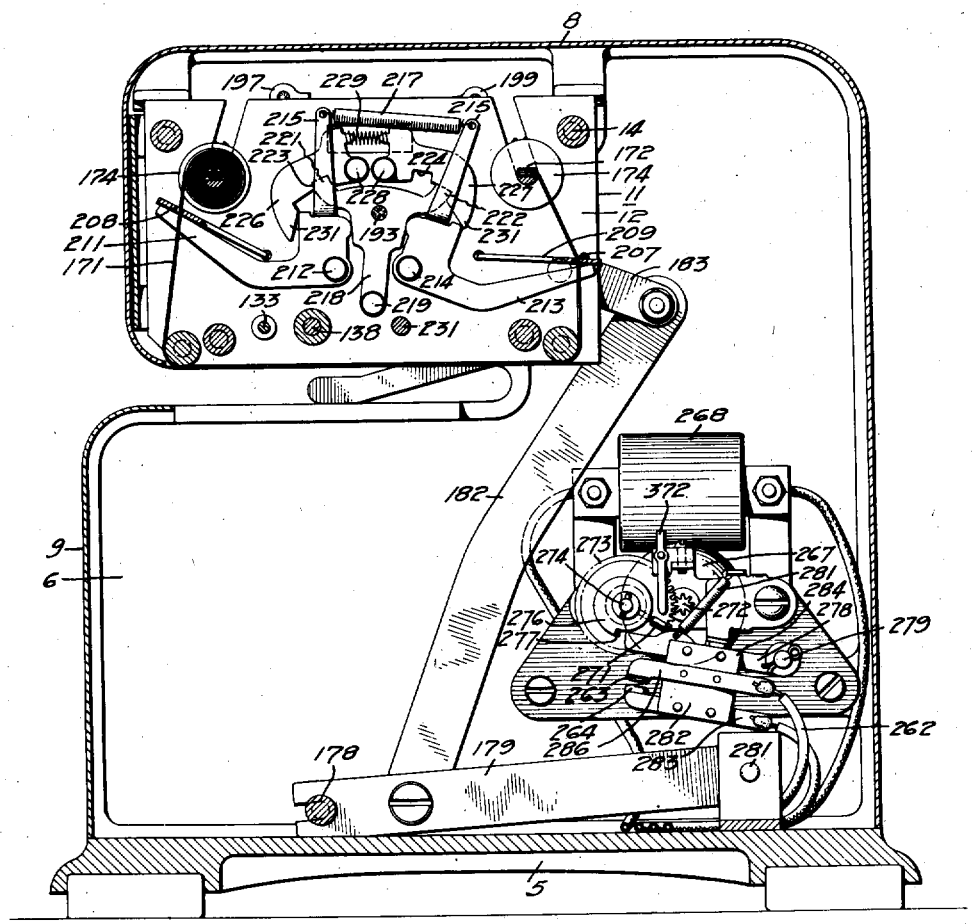
Fig. 5 is a side view with the casing removed showing the opposite side of the interior of my recorder.
Figure 10:
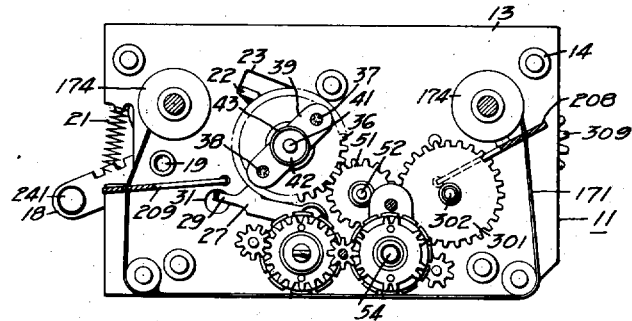
Fig. 10 shows the time unit recording unit in side elevation, the day wheel and its adjacent frame plate having been removed.
Figure 11:
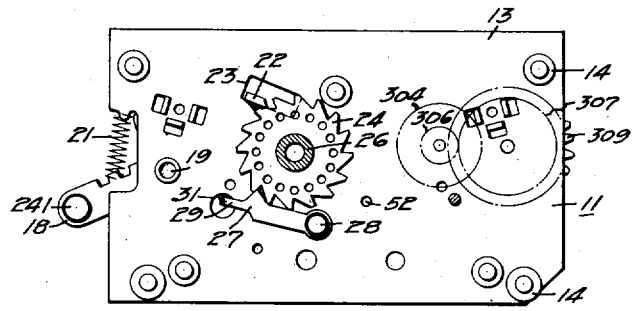
Fig. 11 shows one end plate of the recording unit frame illustrating in detail the main drive ratchet.
Figure 12:
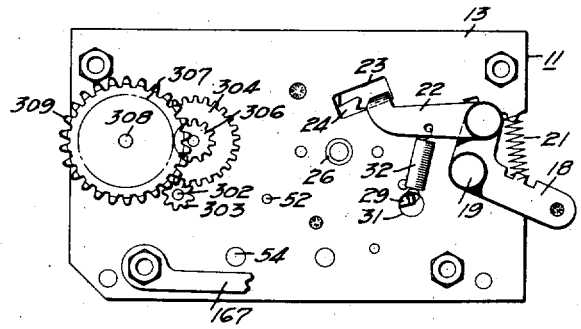
Fig. 12 is a side elevation showing the opposite side of the plate disclosed in Fig. 11.
Figure 13:
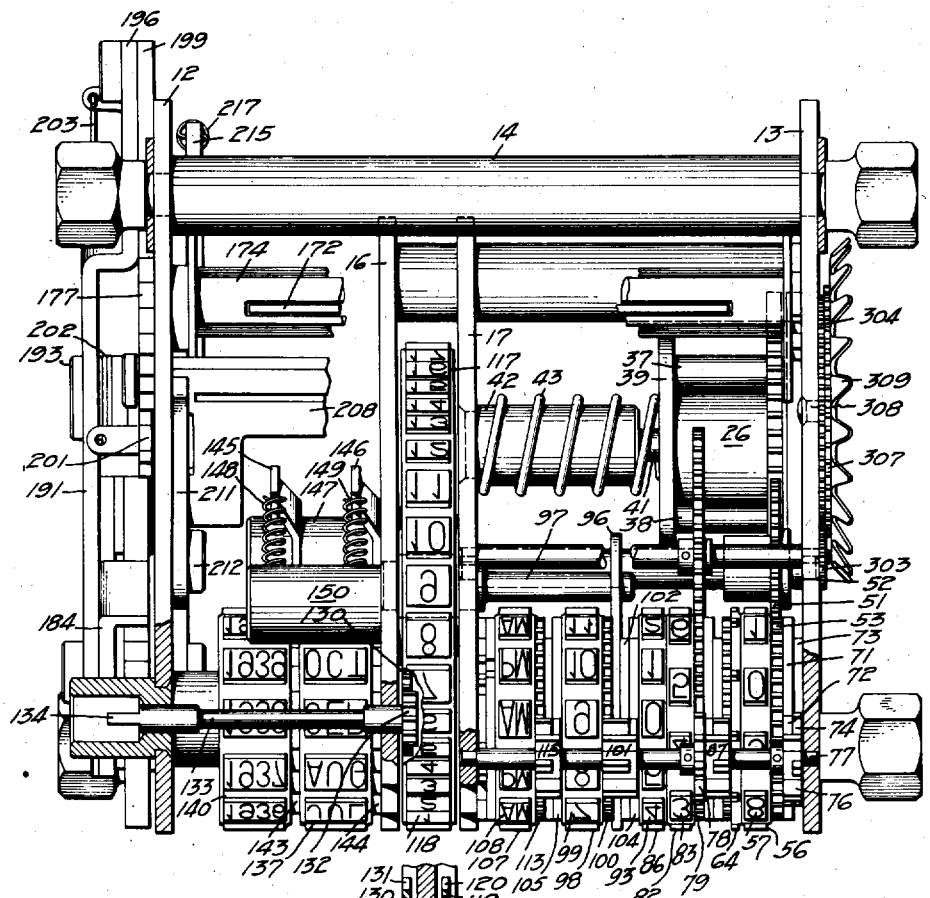
Fig. 13 is a front elevation of the time recording unit, portions being broken away and other portions being shown in cross section to increase the clarity of the figure.
Figure 14:
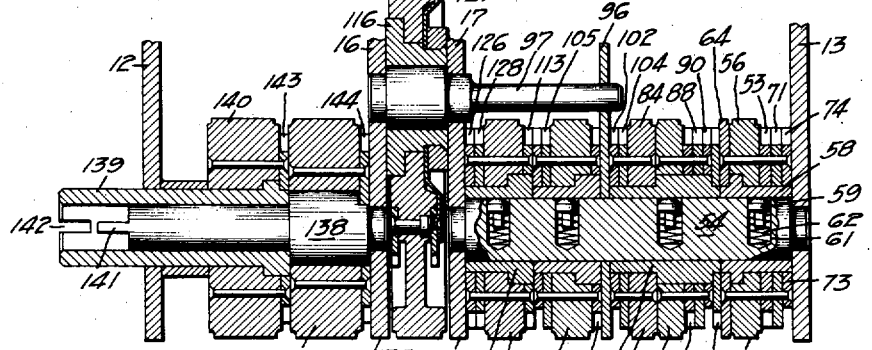
Fig. 14 is a cross section on a vertical plane through the main printing wheel shaft.
Figure 27:
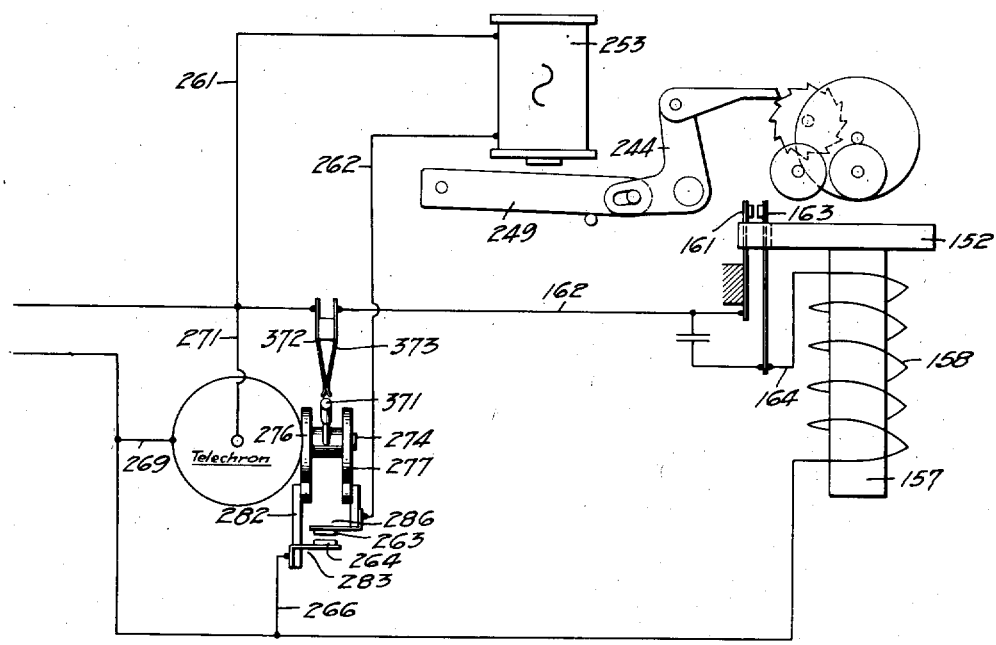
Fig. 27 is a diagram showing schematically the electric circuit utilized in conjunction with my recorder.

When, particularly shown in Fig. 5, the ribbon 171 is substantially unwound from one of the spools, the rod 207 contacts the plate 209, being unable to pass through the aperture therein, and therefore depresses the plate against the lever 13. The depression of this lever causes the latch 227 to be rotated about its pivot 228, by virtue of the cam contact between the lever 213 and the latch, to lift the notch 224 from the ear 222. The movement of lever 213 also extends spring 217 thereby placing additional pressure against the plate 218. Since the latch 226 is released, the plate 218 is rocked slightly about its pin 219 to shift pin 193. This action translates the entire ratchet feeding mechanism, as shown in Fig. 4, to disengage ratchet 176 and engage the other ratchet 177 thereby reversing the direction of ribbon advance. A similar operation takes place when the ribbon is substantially unwound from the other spool. By virtue of this mechanism the ribbon is advanced one step for each printing operation of the machine and is automatically reversed when it approaches the limit of its movement.

In order to make the printing mechanism operate in timed sequence so that successive indications of time give a true index of time I preferably provide means for operating the bell crank 8. Detachably connected to a pin 241 mounted on the bell crank is a link 242 at one end pivoted as at 243 to a bell crank 244. The bell crank 244 is pivoted as at 246 to the frame of the machine and is provided with a slot 247 at its opposite end to receive a pin 248 on a lever 249. The lever in turn is mounted on a pivot as at 251.

Oscillatory movement of lever 249 operates through bell crank 244 and link 242 to provide the requisite movement of bell crank 18.

Movement of lever 249 is preferably effected electrically and to this end I provide an armature 252 on lever 249 adapted to co-operate with a solenoid or electromagnet 253 suitably mounted on a field piece 254 secured to the frame of the machine. When the electro-magnet or solenoid 253 is energized, an impulse is imparted to the bell crank 18 so that by suitably timing periodic energizations of the solenoid I am enabled to time the operation of the printing mechanism to afford a correct index or indication of time. The circuit to the solenoid 253 preferably includes a conductor 261 leading to one side of a source of electro-motive force and also includes a conductor 262 leading through contacts 263 and 264 to a conductor 266 connected to the other side of the source of electro-motive force.

In accordance with my invention I provide means for closing the contacts 263 and 264 periodically to affect the electric circuit so that an impulse is delivered to the printing mechanism to effect conditioning thereof. Mounted on the base 5 is an electric motor 267 provided with a field 268 connected to a source or electro-motive force by conductors 269 and 271. Preferably the electric motor is of the synchronous alternating current type designed to run or revolve in synchronism with a generator delivering electromotive force at a constant or substantially fixed predetermined frequency. Ordinarily the frequency is sixty cycles per second and the revolutions of the motor 267 synchronize with such frequency so that a predetermined number of revolutions of the motor 267 occur in a predetermined interval of time without substantial variation therefrom. Such electric motors are known in the trade as "Telechrons".

In order to render the operation of motor 267 effective upon the contacts 263 and 264 I mount on the motor shaft a pinion 272 which meshes with a gear 273 on a shaft 274. This shaft is rotatable and at its extremity carries a pair of spiral cams 276 and 277. The polar arrangement of the spiral cams on shaft 274 is such that the radial portions of the cam surfaces are slightly out of phase. Riding on cam 276 is a follower 278 pivotally mounted, as at 279, on the framework and urged against the cam by a spring 281. The follower carries an insulating block 282 to which is fastened a contact arm 283 carrying the contact 264. In a similar fashion cam 277 is provided with a follower urged against the cam by a suitable spring and carrying an insulating block 284 to which is fastened a contact arm 286 carrying contact 263.

The rotation of the shaft 274 is in time with the rotation of motor 267. The cams during their rotation gradually displace the contact arms 283 and 286 in unison but with the contacts 263 and 264 separated. Since the spiral cams 276 and 277 are slightly out of phase, the lower contact arm 283 is released by its cam under the urgency of its spring slightly prior to the release of the upper contact arm 286. This permits the contacts to touch momentarily and energizes the circuit to the solenoid 253. The differential movement of the contacts 263 and 264 is effective to prevent arcing of the contacts and to give the practically instantaneous energization of the circuit that is desired. Since the motor 267 operates synchronously at substantially a predetermined constant frequency, regularly timed impulses are afforded the printing mechanism.

If desired these impulses may be utilized to give a visual time indication. This may be effected by mounting a gear 301 in mesh with the intermediate gear 51. Mounted on the shaft 302 of the gear 301 and on the opposite side of the mounting plate 13 is a pinion 303 operating through reduction gears 304 and 306 to drive a gear 307 on a stub shaft 308 mounted on plate 13. Revolving in unison with the shaft 308 is a crown gear 309 projecting toward the front of the framework and meshing with a cooperating crown gear 311 for driving suitable indicating hands 312 and 313 of a clock 319.

As an adjunct to the mechanism I provide means for impressing the sheet or other device receiving the indicia with a number denoting the number of operations of the machine. To this end I provide a shaft 321 journalled in the plates 12 and 13 passing through the intermediate plates 16 and 17. At one end, shaft 321 is provided with a ratchet 322 located adjacent the bell crank 184 of the ribbon advancing mechanism. For rotating the ratchet 322 I preferably locate a pawl 323 on the bell crank 184. The pawl is preferably held against the ratchet by a spring 324 so that for each reciprocation of the bell crank 184 the ratchet 322 is advanced one step. Such steps are thus in accordance with the number of operations of the platen 152. To prevent retrograde movement of the ratchet I mount a pawl 326 on the pivot pin 186 and urge it into place by a spring 327.

In this wise, shaft 321 is given a periodic fractional rotation in exact accordance with the number of operations of the stamping mechanism. Fixed on shaft 321 I provide a unit wheel 328 bearing suitable printing indicia on the surface thereof. For each step of the intermittent rotation of shaft 321 the printing wheel is advanced from one indicium to the next successive indicium. Associated with the unit wheel is a tens wheel 329 mounted on a sleeve 331 encompassing the shaft 321. In order to advance the wheel 329 one step for each complete cycle or rotation of wheel 328 I preferably provide an interrupted gear 332 and a notched disc 333 in a unit with the wheel 328. Engaging the gear 332 and the disc 333 is a gear 334 fixed on a shaft 336 journalled in the plates 13 and 17. The shaft 336 is revolved a portion of a complete revolution for each revolution of the gear of the printing wheel 328. This amount of revolution in turn revolves a gear 337 affixed to the shaft 336 and meshing with a gear 338 fastened on the sleeve 331. The proportion of the gears is such that for each complete revolution of the wheel 328, the wheel 329 is advanced one tenth of a revolution.

In a similar fashion I provide means for advancing a hundreds printing wheel 341 one tenth of a revolution for each complete revolution of the wheel 329. In a unit with gear 338 are a notched disc 342 and an interrupted gear 343 which mesh with a gear 344 loosely journalled on shaft 336. The gear 344 also meshes with a gear 346 affixed to the hundreds wheel 341. Thus for each complete revolution of the tens wheel 329, the hundreds wheel is advanced one tenth of a revolution or a sufficient amount to bring the next successive indicium into proper printing position. An irregular terminal 347 on the shaft 321 affords a convenient means for revolving the shaft manually to effect the printing wheels. wheels are conveniently disposed in the printi mechanism unit for printing the number of t operation on each sheet or device which recei a stamped indication of time.

To supplement or augment the printing mec anism and to supplement or replace the conse utive numbering device just described I may p vide the printing mechanism shown particula in Figs. 21 to 23 inclusive. Mounted betwe plates 13 and 17 is a shaft 351 adapted to be volved by a knurled handle 352 projecting on t exterior of the machine. The handle may be legends 353 thereon operating with a pointer for indicating the relative angular position of t shaft 351. Mounted on shaft 351 and adapted be disposed in printing relationship is an indic drum 356 carrying on its surface legends printing. In the present instance, eight su legends are shown, any one of which may be us at the discretion of the operator. To mainta the indicium drum 356 in registering position preferably provide it at one end with a ratch wheel 357 which is engaged by a pawl 358 pivot as at 359 to the intermediate plate 17 and he in interengagement with the ratchet by a c spring 361.

To prevent the possibility of the platen 152 b ing projected during an automatic conditioni movement of the printing wheels, I mount an i sulated radial arm 371 on shaft 274 to revol therewith. The arm 371 is effective to pass b tween and separate normally closed contacts 3 and 373 interposed in the conductor 162. T position of the arm is such that the circuit to t platen solenoid 158 is momentarily broken at t time the contacts 263 and 264 are in abutment cause conditioning and movement of the printi wheels.

In accordance with my invention I have pr vided an automatic machine for correctly affor ing an indication of time and for printing t correct indication on a sheet or other devi simply by the insertion of the sheet into the m chine.

It is to be understood that I do not limit myse to the form of the recorder shown and describe herein, as the invention, as set forth in t following claim may be embodied in a pluralit of forms.

What is claimed is,

In a recording device, a plurality of type wheel a printing platen normally spaced from said typ wheels and movable into contact therewith to e fect a printing stroke, a pair of relatively mov able contacts near the end of the path taken b a sheet inserted between said platen and sai type wheels, a solenoid for actuating the plate having an energizing circuit controlled by sai contacts, a guide member having an inclined sur face against which the inserted sheet is guide to insure abutment of the forward edge of sai sheet with one of said contacts, said one contac being movable against the other contact by th inserted sheet, whereby said platen is actuated t effect a printing stroke means including sai platen for moving the inserted sheet out of en gagement with said one contact, thereby permit ting return of said one contact to normal positio to open the energizing circuit of the solenoid.

CARL M. F. FRIDEN.